United States Patent [19]

Kipphan et al.

[11] Patent Number: 4,668,090

[45] Date of Patent: May 26, 1987

[54] MEASURING AND/OR COLOR MATCHING TABLE WITH A SHEET SUPPORT SURFACE

[75] Inventors: Helmut Kipphan, Schwetzingen; Anton Rodi, Leimen; Peter Blaser, Dielheim, all of Fed. Rep. of Germany

[73] Assignee: Heidelberger Druckmaschinen AG, Heidelberg, Fed. Rep. of Germany

[21] Appl. No.: 491,987

[22] Filed: May 5, 1983

[30] Foreign Application Priority Data

May 6, 1982 [DE] Fed. Rep. of Germany ....... 3216991

[51] Int. Cl.4 ...................... G01N 21/01; A47F 5/16; G09F 13/04

[52] U.S. Cl. .................................... 356/244; 108/23; 362/33; 362/94

[58] Field of Search ............... 356/244, 245, 238, 402, 356/425, 443, 444; 362/33, 97; 354/348-350; 108/23; 101/127.1, 211; 355/113; 40/361; 248/412; 250/559

[56] References Cited

U.S. PATENT DOCUMENTS

| | | | |
|---|---|---|---|
| 1,984,898 | 12/1934 | Schambach et al. | 356/443 X |
| 2,101,710 | 12/1937 | Huber | 356/443 X |
| 3,104,492 | 9/1963 | Banks | 108/23 |
| 3,784,289 | 1/1974 | Wicker | 101/211 X |
| 4,159,871 | 7/1979 | Arnone | 362/33 X |
| 4,180,741 | 12/1979 | Palmatier et al. | 250/559 |

FOREIGN PATENT DOCUMENTS

| | | | |
|---|---|---|---|
| 2095178 | 9/1982 | United Kingdom | 101/365 |

*Primary Examiner*—Vincent P. McGraw

*Attorney, Agent, or Firm*—Herbert L. Lerner; Laurence A. Greenberg

[57] ABSTRACT

A measuring and/or color matching table having a sheet support surface, including a device for assessing printing quality of a printed sheet deposited on the sheet support surface, and a lighting fixture disposed above and spaced from the sheet support surface, the table having a front side from which the device is operable by an operator, a front part of the sheet supported surface facing towards the operator at the front side of the table and being inclined upwardly at an obtuse angle to a rear part of the sheet support surface.

7 Claims, 3 Drawing Figures

MEASURING AND/OR COLOR MATCHING TABLE WITH A SHEET SUPPORT SURFACE

The invention relates to a measuring and/or color matching table with a sheet support surface having a device for assessing the quality of printed sheets, and a lighting fixture disposed above the measuring and/or color matching table.

Color natching tables and desks have become known which produce areas of dazzle parallel to the front edge of the table or desk within the field of view. The location and width of dazzle depend upon the size of the viewer and his position relative to the desk, as well as upon the inclination of the table surface and the arrangement of the lighting fixture.

A further heretofore known construction calls for an illuminating lamp of conventional design suspended at an inclination behind the viewer.

Also heretofore known are color matching booths which are largely free from reflection and dazzle due to a concave form of the support surface (Deutscher Drucker No. 38/26-11-1981, Page XIX). Uniform light density is thereby attained and shadows are avoided. Manufacture of these heretofore known booths is very expensive and costly. The separate suspension of the lamp from the ceiling of the booth involves much effect and outlay. A further problem is that the light reflected at the focal point can result in dazzling.

Furthermore, with a table surface having a concave shape, the use of manual densitometers is problem because manual densitometers require a flat surface to rest on.

It is accordingly an object of the invention to provide a measuring and/or color matching table having a sheet support which ensures freedom from dazzle and reflection using simple cost-saving means. The device according to the invention permits simple and low-cost manufacture of color matching tables.

With the foregoing and other objects in view, there is provided, in accordance with the invention, a measuring and/or color matching table having a sheet support surface, comprising a device for assessing printing quality of a printed sheet deposited on the sheet support surface, and a lighting fixture disposed above and spaced from the sheet support surface, the table having a front side from which the device is operable by an operator, a front part of the sheet support surface facing towards the operator at said front side of the table and being inclined upwardly at an obtuse angle to a rear part of the sheet support surface.

In accordance with another feature of the invention, the front part of the sheet support surface is on a wedge-shaped structure.

In accordance with a further feature of the invention, the front part of the sheet support surface is on a fold-out table wedge.

In accordance with an additional feature of the invention, the front part of the sheet support surface is at least partly transilluminable through viewing panels disposed at left-hand sides thereof for checking locations of register marks on front and rear sides of the sheet.

In accordance with an added feature of the invention, the wedge-shaped structure is formed of light-weight material and is removable from the table.

In accordance with yet another feature of the invention, the front part of the sheet support surface is formed with a contact edge for the printed sheet deposited thereon, and including a stop plate secured to said contact edge and projecting upwardly beyond said edge so as to prevent the printing sheet from shipping of the sheet support surface.

In accordance with a concomitant feature of the invention, the front part of the sheet support surface is parabolic.

Freedom from reflection and dazzle afforded by the inclined front part is advantageous as regards the visual assessment of color uniformity or color difference. In addition, due to the removal of the wedge-shaped attachment, a flat sheet deposit surface is able to be restored, ensuring the use of densiometers for measuring the ink density throughout the entire color matching range. The surface which is illuminatable from inside is very much to the liking of many printers because a quick check of the register inaccuracy is able to be performed.

Other features which are considered as characteristic for the invention are set forth in the appended claims.

Although the invention is illustrated and described herein as embodied in measuring and/or color matching table with a sheet support surface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
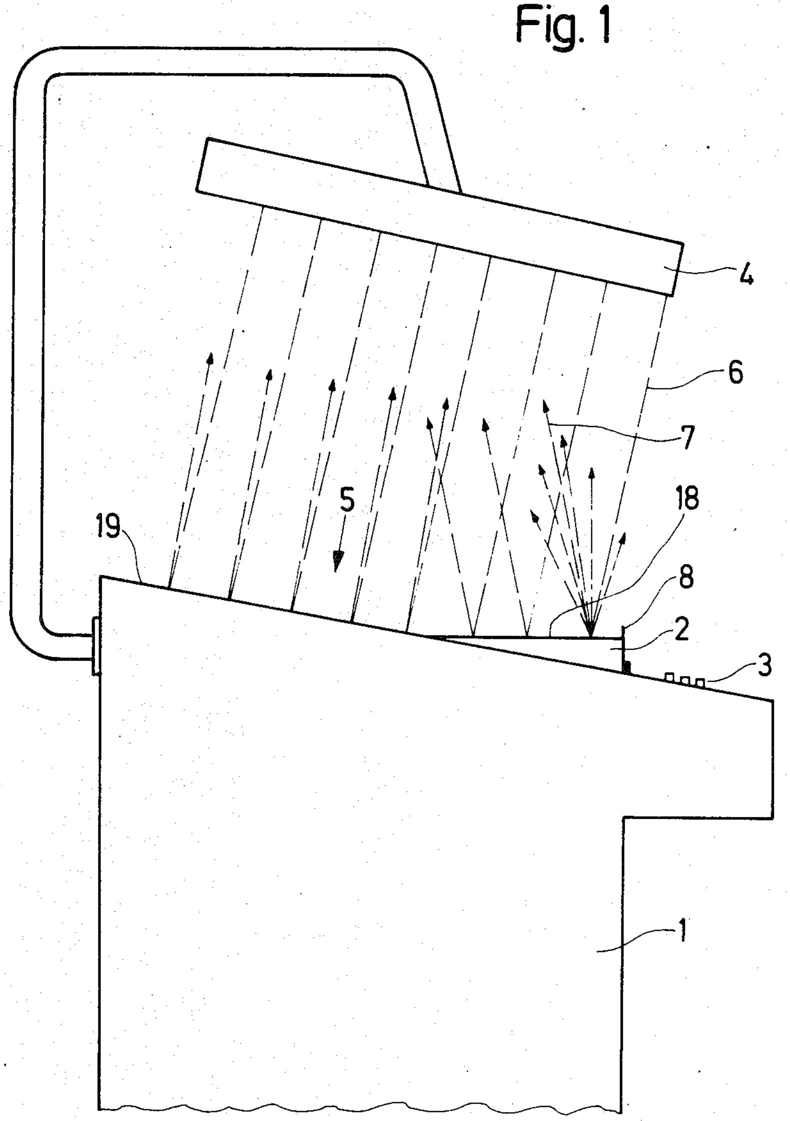
FIG. 1 is a diagrammatic side elevational view of a support table with a wedge-shaped attachment and a lamp incorporated in an embodiment of the invention of the instant application.

Referring now to the drawing and first, particularly to FIG. 1 thereof, there is shown a side elevational view of a support table 1. This support table 1 is electrically coupled to a printing press in such a manner that inking zone adjusting screws can be set with the aid of a control keyboard 3. A sheet support surface 5 of the support table 1 which may be a color matching table is formed of a front part 18 at the front of the table and a rear part 19. The front part 18 is part of a wedge-shaped attachment 2 for preventing reflection and dazzle from affecting an operator at the front part of the support table. Above the support table 1, there is a lamp 4 which is mounted on the support table and ensures uniform illumination under various lighting conditions. The light emitted by the lamp 4 is formed, expressed in simplified form, of incident rays 6 which, according to the physical law that angle of incidence=angle of reflection, are reflected by the printed sheet on the color matching table 1. Due to the wedge-shaped attachment 2, the angle of incidence in the front region of the sheet support surface 5 is changed in such a way that dazzle due to the reflected rays 7, which are directed away from the viewer, is prevented.

Figure 2:
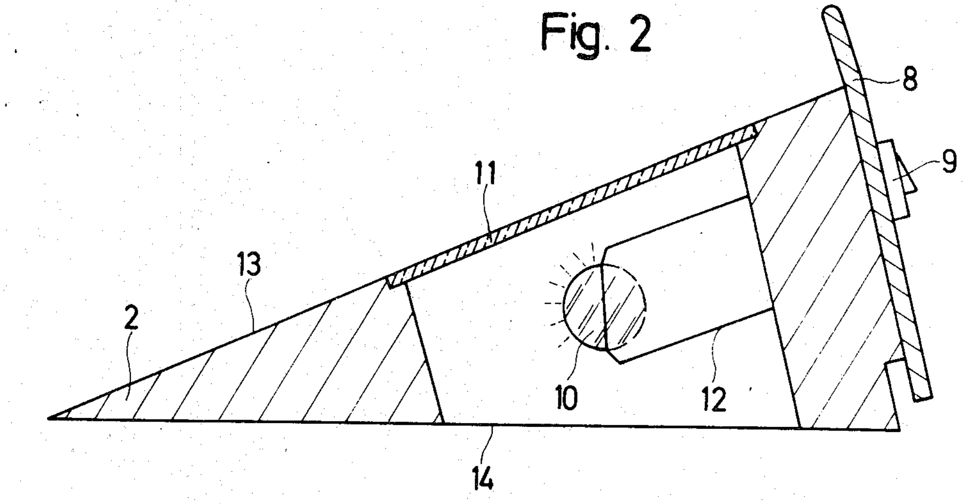
FIG. 2 is an enlarged fragmentary view of FIG. 1 showing the wedge-shaped attachment in a partly sectional side elevational view.
Figure 3:
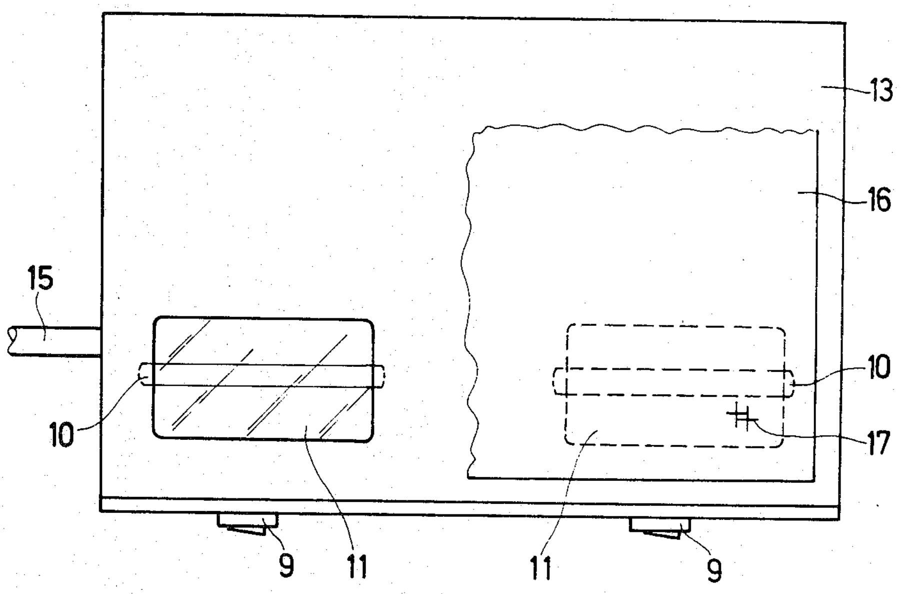
FIG. 3 is a top plan view of the wedge-shaped attachment.

FIG. 2 is a side elevational view of the wedge-shaped attachment 2. A sheet deposit surface 13 of the wedge-shaped attachment 2 corresponds to the front part 18 and is provided with transilluminable fields of vision or viewing panels 11 on the right-hand and left-hand sides, as shown in FIG. 3. A lighting fixture 10 is mounted with a holder 12 underneath the transilluminable viewing panel 11. With the aid of a switch 9, it is possible to switch the lighting fixture 10 on and off. A power supply is provided via an electric cable 15 (FIG. 3). A stop plate 8 is mounted on the wedge-shaped attachment 2 in such a way that it projects beyond the surface 13 so as to prevent a sheet from slipping off the surface.

FIG. 3 is a top plan view of the wedge-shaped attachment 2. On the sheet deposit surface 13 thereof, a sheet 16 having register marks 17 which can easily be distinguished through the transilluminable viewing panels 11 for visual assessment of register inaccuracies has been deposited.

The width of the wedge-shaped attachment 2 may be suitably selected so that commercially available densitometers may be used.

In the preceding description, real diffuse illumination has been neglected; the influence thereof is taken into account, however, by suitably conforming or adapting the inclination of the measuring and/or matching table.

There are claimed:

1. The combination of a measuring and/or color matching table having a top surface declining downwardly from a rear to a front thereof from which the table is to be used by an operator, and a lighting fixture disposed above and spaced from the top surface of the table for illuminating a printed sheet disposed on the top surface of the table comprising an attachment disposed on a front part of the top surface of the table and having, in turn, a top surface inclined upwardly at an obtuse angle to a rear part of the top surface of the table, said attachment serving to deflect and space a printed sheet from said front part of the top surface of the table, and said top surface of said attachment forming with said rear part of the top surface of the table a substantially continuous sheet support surface so disposed as to support a printed sheet thereon which reflects light illuminating the sheet from the lighting fixture away from the eyes of the operator.

2. Table according to claim 1 wherein said front part of the sheet support surface is on a wedge-shaped structure.

3. Table according to claim 1 wherein said front part of the sheet support surface is on a fold-out table wedge.

4. Table according to claim 1 wherein said front part of the sheet support surface is at least partly transilluminable through viewing panels disposed at left-hand and right-hand sides thereof for checking locations of register marks on front and rear sides of the sheet.

5. Table according to claim 2 wherein said wedge-shaped structure is formed of light-weight material and is removable from the table.

6. Table according to claim 1 wherein said front part of the sheet support surface is formed with a contact edge for the printed sheet deposited thereon, and including a stop plate secured to said contact edge and projecting upwardly beyond said edge so as to prevent the printing sheet from slipping off the sheet support surface.

7. Table according to claim 1, wherein the table has a rear, and including means for supporting said lighting fixture at said rear of the table.

* * * * *